May 21, 1974  A. S. RYAN  3,812,001

CUSHIONED ABSORBENT PAD

Filed Dec. 17, 1971

United States Patent Office 3,812,001
Patented May 21, 1974

3,812,001
CUSHIONED ABSORBENT PAD
Arthur Sensor Ryan, Kelso, Wash., assignor to
Weyerhaeuser Company, Tacoma, Wash.
Filed Dec. 17, 1971, Ser. No. 209,213
Int. Cl. A61f *13/16;* B32b *3/10*
U.S. Cl. 161—114                     3 Claims

ABSTRACT OF THE DISCLOSURE

An absorbent pad has a layer of absorbent material together with a plurality of load-bearing members positioned therein that are generally equal to the thickness of the absorbent layer. The load applied to the overall pad is taken primarily by the load-bearing members allowing the absorbent material to remain in a relatively uncompressed state and free to absorb liquid.

BACKGROUND OF THE INVENTION

This invention relates generally to absorbent pads and more particularly to an improved load-bearing absorbent pad which is suitable for the manufacture of disposable diapers and incontinent pads.

The prior art containers many examples of disposable absorbent pads, diapers, and the like which are comprised of several discreet layers, each having an independent function. These discreet layers cooperate functionally to provide an absorbent pad that is comfortable, highly absorbent, and will retain fluids between an upper pervious layer and a lower liquid impervious layer. For example, a standard disposable diaper known to the art is comprised of a first layer of a nonwoven tissue material which contacts the skin, a second layer of liquid absorbing material, and a third backing layer of liquid impervious material, such as polyethylene film. These absorbent pads can be structured in the shape of a diaper and, in fact, are utilized as disposable diapers for infants. Another end use where the present invention could be utilized is that of a flat absorbent pad beneath an incontinent person.

One example of an absorbent pad known to the prior art is that disclosed in the patent to J. P. Gallagher— 3,468,311, issued Sept. 23, 1969. Gallagher generally discloses a three-layer absorbent pad wherein the first layer, or that layer which is adjacent to an infant's body or to a patient's body, is comprised of a pneumatic cellular layer which is pervious to liquid. This pneumatic cellular layer represents a cushion on which the body is in contact. The primary purpose of the pneumatic cellular layer is to provide a comfortable cushion zone for the object being supported. The next layer in the Gallagher structure is the highly absorbent layer which ideally retains the liquid which passes through the perforated pneumatic cellular layer. Positioned adjacent the absorbent layer on the opposite side thereof is a liquid impervious layer which operates to contain the liquid within the bounds of the highly absorbent layer.

While the absorbent pad, as disclosed in the Gallagher patent, offers a very comfortable diaper or the like, it does not offer good load-bearing characteristics, and, in fact, will tend to lose its liquid carrying ability when the applied load tends to reduce the thickness of the inner absorbent pad. For example, in the Gallagher absorbent pad when it is structured into an infant diaper and assuming its absorbent inner pad had collected a large amount of liquid, it is readily apparent that a load applied to the outer cellular layer would tend to squeeze the liquid out of the inner absorbent pad thereby causing wetness to the body being supported or to the surrounding area.

Accordingly, from the foregoing, one object of the present invention is to provide a comfortable absorbent pad which has improved liquid holding characteristics.

Another object is to provide an absorbent pad which has improved load-bearing characteristics.

These and other objects of the invention will become apparent upon reading the following specification in conjunction wtih the attached drawing.

SUMMARY OF THE INVENTION

Briefly, this invention is practiced in one form by constructing an absorbent pad from a layer of absorbent material having load-bearing members positioned therein that are generally equal to the thickness of the absorbent material. An impervious backing layer can be applied to one of the surfaces of the absorbent material. The load applied to the pad is taken primarily by the load-bearing members while leaving the absorbent material free to absorb liquid.

DESCRIPTION OF THE PREFERRED EMBODIMENT

Figure 1:
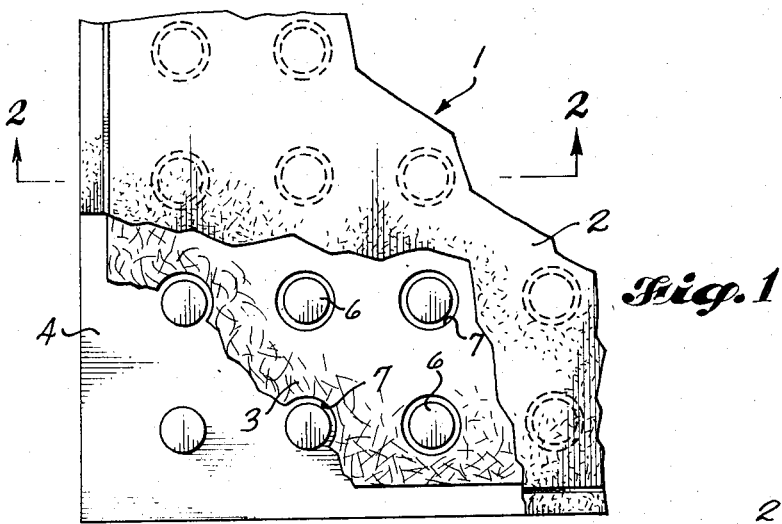
FIG. 1 is a top plan view showing a portion of an absorbent pad constructed according to the present invention.

Turning first to a description of the invention as depicted in FIG. 1, a portion of an absorbent pad is generally indicated at 1. The absorbent pad 1 can, for example, be structured in any desired shape, such as that of a diaper, for final usage. It will also be apparent that the absorbent pad could be a large mat which would be utilized as a bed pad or the like.

The absorbent pad 1 can be constructed generally along lines known to the prior art. A top surface 2 can be employed and is comprised of a soft woven or non-woven fabric-like tissue which would operate to improve moisture distribution such that liquid will tend to wick away from any spot application. The tissue layer 2 also operates to distribute stress from any load that is applied to the overall absorbent pad 1. Beneath the top tissue layer 2 is the highly absorbent layer 3 which may be comprised of any absorbent natural or synthetic fiber, woven or non-woven coarse material. Satisfactory results have been obtained by the use of mats or bats of synthetic fibers, mixtures of synthetic fibers, non-woven cellulosic bats, or open-cell sponge-like sheets. Any material may be utilized which is highly absorbent and which can be made in the form of a sheet-like mat. The final layer can be a liquid impervious layer 4 that would be positioned beneath the absorbent inner pad 3. Suitable bonding means are provided to hold the three layers together in their proper relationship.

Figure 2:
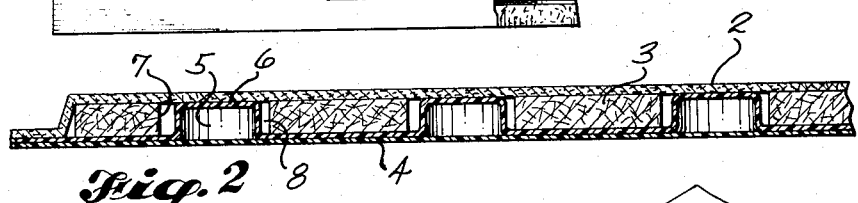
FIG. 2 is a cross-section of the absorbent pad taken through several of the upstanding air blisters.

Referring both to FIGS. 1 and 2, the liquid impervious layer 4 is substantially modified over the prior art and is comprised of a suitable sheet material which has a plurality of air-filled blisters 5 or other suitable load-bearing members extending upwardly therefrom. A suitable material for the liquid impervious layer 4 could be polyethylene or the like, as long as it can operate to establish and maintain the upwardly extending blisters 5. One method of producing such an impervious layer 4 with the upstanding blisters 5 is that disclosed in the J. H. Lemelson patent—3,523,055, issued Aug. 4, 1970. It should also be noted that while air-filled blisters 5 are simple to manufacture, other suitable material could be within the blisters 5, such as water or the like. Similarly, other matter such as foam material having a higher resistance to compression than the absorbent pad could be utilized.

In order to accommodate the upstanding blisters 5 which generally have a horizontal flat top 6, a plurality of apertures 7 are appropriately positioned within the absorbent pad material 3. Apertures 7 may be appropriately die cut in the forming process for the absorbent pad 3. The apertures 7 are sized such that a suitable clearance 8 is provided between the blisters 5 and the apertures 7 for the joining step of the impervious layer 4 with the absorbent pad layer 3.

It should be noted that the vertical height of the blisters 5 is approximately equal to the thickness of the absorbent pad material 3. The spacing between adjacent blisters 5 and consequently the apertures 7 within the absorbent pad material 3 is appropriately selected in order to offer sufficient load-bearing area; the load-bearing area generally being the horizontal tops 6 of the blisters 5. Tops 6 could also be in other suitable shapes.

Figure 3:
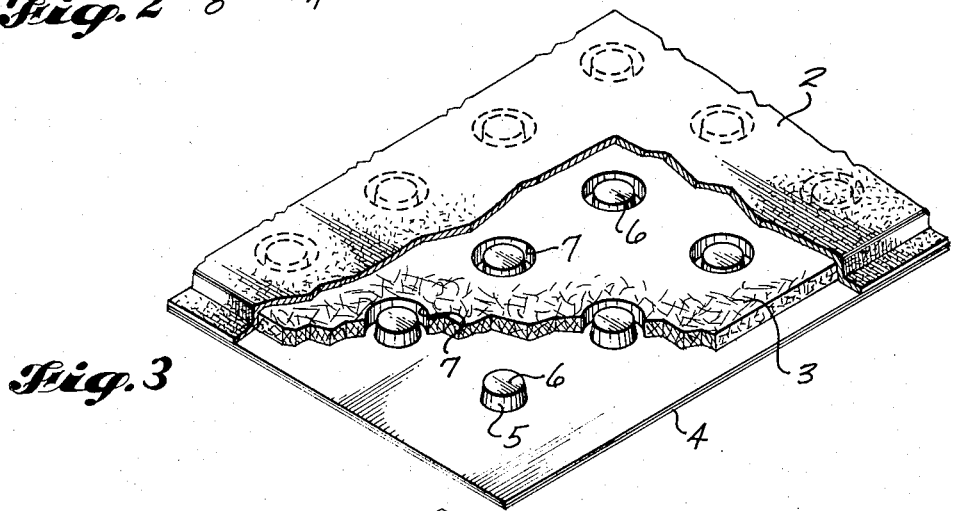
FIG. 3 is an isometric view showing a similar three-layer absorbent pad.
Figure 4:
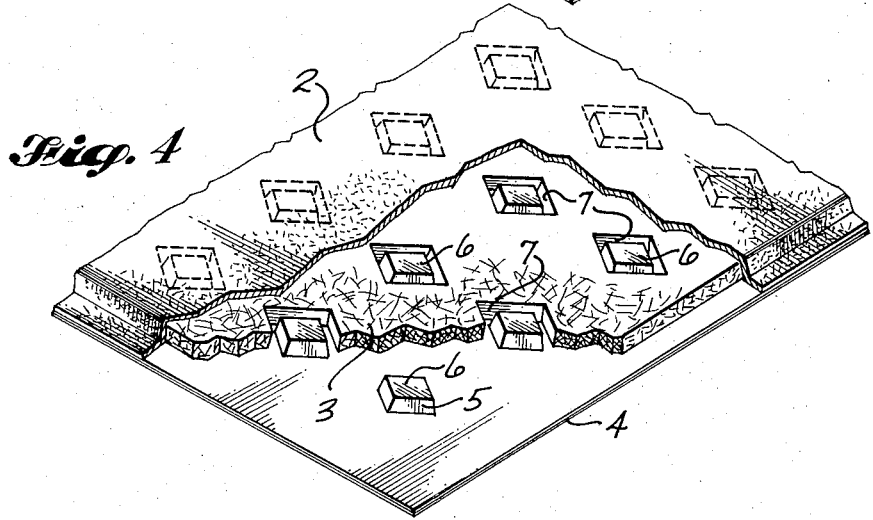
FIG. 4 is a similar isometric showing diamond shaped air blisters.

The isometric views of FIGS. 3 and 4 show the several layers in their cooperating relationships with one another while FIG. 4 in particular shows an alternate embodiment whereby the blisters 5 have their horizontal tops 6 in the shape of a diamond.

Of course, one skilled in the art will realize there are alternatives to the pad construction. For example, the upstanding blisters 5 could be more or less continuous within the absorbent layer 3 with the absorbent material then being placed between blisters. Another embodiment within the scope of this invention is to position load-bearing members throughout the absorbent layer 3. It is not absolutely necessary to utilize load-bearing air blisters that extend from an impervious layer. The load-bearing members can be independent of any layer.

OPERATION OF THE INVENTION

After the several layers are formed into the overall absorbent pad 1, it will be appreciated that the horizontal tops 6 of the load-bearing members 5 will be approximately at the same height as the top tissue layer 2. It will be appreciated that while a three-layer absorbent pad has been described, the top tissue layer is also not absolutely necessary for the proper functioning of the instant invention.

Assuming that the absorbent pad 1 has been structured into a diaper, after it has been positioned on the infant the infant's body weight will generally be borne by the blisters or load-bearing members 5. By allowing the load-bearing function to be accepted by the blisters 5, the inner absorbent pad material 3 will then be allowed to either hold more liquid, or conversely, the size of the absorbent pad material can be decreased, since a smaller amount of material will tend to hold an equivalent amount of liquid compared to a conventional pad having greater thickness. It will further be appreciated that the clearances 8 between the blisters 5 and the apertures 7 operate to further distribute liquid in that liquid will tend to flow down the sides of the blisters 5 and be distributed about the bottom of the absorent pad material 3.

Thus, it will be appreciated that an improved absorbent pad has been disclosed which shifts the load-bearing function from the absorbent pad material to load-bearing members which are positioned throughout the absorbent pad.

While a detailed example of the principal embodiment has been described, it is understood that many changes and modifications may be made in the above described absorbent pad without departing from the spirit of the invention. All such modifications are intended to be included within the scope of the appended claims.

What is claimed is:

1. A generally conformable absorbent pad of the type having at least one definable layer of compressible liquid absorbent material having top and bottom surfaces wherein the improvement comprises:

a plurality of spaced apart compression resistant load-bearing members positioned within the layer of absorbent material between the top and bottom surfaces thereof such that when a pressure force is applied to the absorbent pad the load-bearing members will accept a substantial portion of the force thereby allowing the absorbent material to remain in a generally uncompressed state, and a fluid impervious layer being positioned against the bottom surface of said layer of absorbent material in order to confine the absorbed fluid within the layer of absorbent material.

2. The improvement as in claim 1 in which the load-bearing members are comprised of air filled blisters positioned within apertures in the absorbent pad.

3. The improvement as in claim 1 in which the load-bearing members are substantially the same thickness as the absorbent material.

References Cited

UNITED STATES PATENTS

| 3,446,692 | 7/1969 | Turnbull | 161—161 |
| 3,468,311 | 9/1969 | Gallagher | 128—296 |
| 3,523,055 | 8/1970 | Lemelson | 161—43 |

GEORGE F. LESMES, Primary Examiner

S. S. SILVERMAN, Assistant Examiner

U.S. Cl. X.R.

128—284, 296; 161—109, 113, 127, 160, 161, 410